United States Patent [19]

Servadio et al.

[11] 3,914,442

[45] Oct. 21, 1975

[54] STABILIZATION OF VODKA

[75] Inventors: Gildo J. Servadio, Simsbury; Arthur W. Perreault, East Granby; John C. Jones, South Windsor, all of Conn.

[73] Assignee: Heublein, Inc., Hartford, Conn.

[22] Filed: June 10, 1974

[21] Appl. No.: 478,135

Related U.S. Application Data

[63] Continuation of Ser. No. 270,399, July 10, 1972, abandoned.

[52] U.S. Cl. ................ 426/271; 426/192; 426/422
[51] Int. Cl.² .......................................... C12H 1/04
[58] Field of Search ............. 426/14, 192, 271, 330, 426/422, 493, 494, 474, 475, 365

[56] References Cited
UNITED STATES PATENTS

| | | | |
|---|---|---|---|
| 2,520,189 | 8/1950 | Zarow | 426/271 |
| 2,879,165 | 3/1959 | Hendel | 426/475 |
| 2,946,687 | 7/1960 | Jacobs | 426/365 |
| 3,698,913 | 10/1972 | Malinin | 426/474 |

OTHER PUBLICATIONS

Amerine et al., The Technology of Wine Making, 2nd ed., The Ari Publ. Co. Inc., Westport, Conn., 1967 (pp. 295–299).

Primary Examiner—David M. Naff
Attorney, Agent, or Firm—Blum, Moscovitz, Friedman & Kaplan

[57] ABSTRACT

Vodka is stabilized and shelf-life is increased by ion exchange treatment to remove polyvalent ions introduced from charcoal and to provide a pH within the range of about 7.2 to about 9.

4 Claims, 1 Drawing Figure

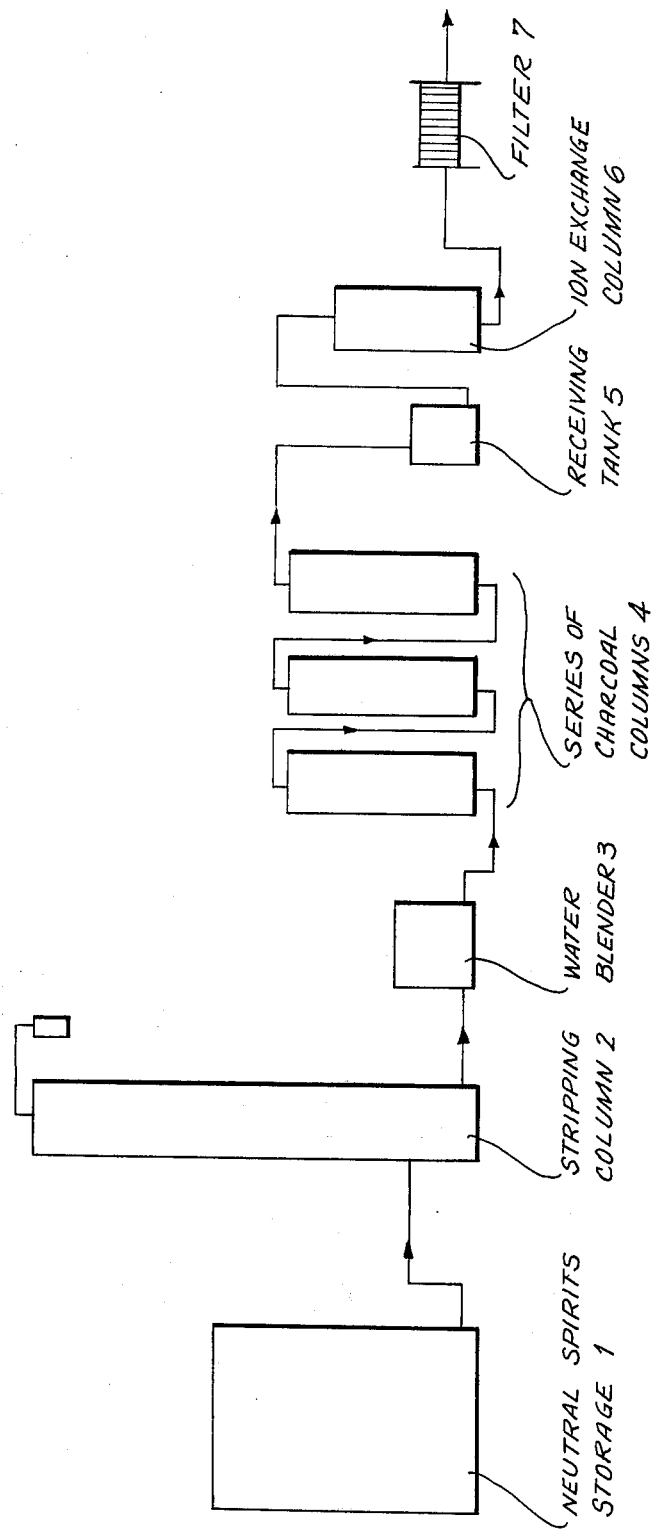

STABILIZATION OF VODKA

This is a continuation of application Ser. No. 270,399, filed July 10, 1972, now abandoned.

BACKGROUND OF THE INVENTION

In the preparation of vodka it is desirable that congenerics responsible for taste and odor be removed insofar as is possible. A treatment which has been effective for this purpose is the contacting of vodka with activated charcoal as described in U.S. Pat. No. 2,946,687.

It has been found, however, that after the vodka is bottled, it may develop a haze or a deposit which while not deleterious to the potability of the liquor, nevertheless impairs its appearance. This difficulty is believed to be due to the presence of polyvalent cations in the charcoal, the content of such ions depending greatly on the source of the charcoal. This difficulty has previously been resolved by impregnating the charcoal with carbon dioxide, which reacts with polyvalent cations to form insoluble carbonates. These carbonates are retained by the charcoal.

These polyvalent ions, however, are not the only possible cause of the formation of haze or small particles. Where the pH of the vodka is high, say up to 11, so-called angel wings or spicules are formed which detract from the appearance of the product. The formation of said angel wings or spicules in the vodka is a function of time and temperature as well as of pH.

SUMMARY OF THE INVENTION

It has been found that in the treatment of vodka with charcoal for the purpose of removing congenerics, polyvalent metallic ions such as calcium and manganese may be dissolved in the vodka, depending on the nature of the charcoal used and the residence time of contact between the charcoal and the vodka. These polyvalent metallic ions can be removed from the vodka by treatment with a strongly acid cationic exchange resin in the sodium form. Also, the ion-exchange resin adjusts the pH of the vodka to a desired range, these processes stabilizing said vodka as measured by the increase in shelf-life.

Accordingly, an object of the present invention is to provide an improved vodka with greatly increased shelf-life as indicated by freedom from haze and deposits and spicules.

Another object of the present invention is to provide an improved vodka from which polyvalent metallic ions have been removed.

Yet another object is to provide an improved vodka having a pH within a desired range.

A further object of the present invention is to provide an improved method for removing haze and deposit-forming ions from vodka.

Still another object of the present invention is to provide an improved method of removing polyvalent ions from vodka.

Yet a further object of the pressent invention is to provide an improved method of adjusting the pH of the vodka.

Still other objects and advantages of the invention will in part be obvious and will in part be apparent from the specification.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

BRIEF DESCRIPTION OF THE DRAWING

For a fuller understanding of the invention, reference is had to the following description taken in connection with the accompanying drawing, in which:

The single FIGURE is a flow diagram of the process in accordance with the present invention.

DESCRIPTION OF THE PREFERRED EMBODIMENTS

In the preparation of vodka it is a general objective to eliminate taste and odor insofar as is possible. Although sensitive analytic techniques are used for this purpose, the ultimate test is organoleptic, namely, sampling by a panel of experts. Extensive taste-testing by such experts has shown that passage over charcoal which is properly activated results in a superior product. However, it has been found that after storing in glass bottles for a substantial period of time, haze may develop. Also, occasionally, deposit of a small quantity of a brown precipitate on the surface of the glass occurs. The formation of such haze and deposit is accelerated by storage at elevated temperature such as may be the case in hot climate. Careful analysis of the product after percolation or filtration through charcoal beds has shown that the haze and the precipitate are probably due to the presence of minute quantities of ions of polyvalent metals.

As aforenoted, this problem previously was handled by impregnation of the activated charcoal with small quantities of carbon dioxide, the objective being to form carbonates of the polyvalent metals which are extremely insoluble. The method has been successful, but is relatively expensive, largely due to the fact that the charcoal must be treated in batches so that considerable labor is involved. Moreover, the range of types of charcoal which may be used is being narrowed by the fact that certain types of charcoal, in the preparation thereof, cause much more contamination of the atmosphere than other types. Another factor is that in certain types of charcoal, otherwise suitable for use in the purification of vodka, the content of polyvalent ions is undesirably high.

It has been found that vodka treated with a suitable ion-exchange resin after passage through activated charcoal eliminates polyvalent ions to the point where they are undetectable by the analytical techniques used thus far. Moreover, by the choice of a suitable ion-exchange resin the pH of the vodka produced may be brought to a range in which formation of haze, deposit or spicules is at a minimum. Vodka treated in this way is so stabilized that it remains free of either haze or deposit on the wall of the bottle, even after storage at 120°F for extended periods of time.

The method of treatment is illustrated in the flow diagram where neutral spirits, stored in tank 1, pass to a stripping column 2 in which the more volatile constituents of the neutral spirits are removed. Product is taken from the bottom of stripping column 2 and passes to water-blender 3 wherein the neutral spirits are blended to approximately 110 proof. The diluted alcohol from water-blender 3 passes through a series of charcoal beds 4 into a receiving tank 5. The diluted alcohol in receiving tank 5, which may now fairly be called vodka, then passes through ion-exchange column 6 in which polyvalent metal ions are removed and the pH is adjusted to a desired range and finally passes through filter 7 which removes any solid material carried along by the vodka from the ion-exchange column.

The pH of the vodka produced by the present process should not be lower than 7.2 and may be as high as 9.0 without causing difficulty as represented by formation of haze, deposit or spicules in the bottle. The preferred pH range is from about 8.0 to 8.4. Testing of vodka produced in this way, by a panel of experts, has shown that the taste of the product vodka is not degraded in any way by the treatment with ion-exchange resin.

Although a variety of ion-exchange resins may be used for the purposes aforenoted, a preferred resin is Duolite ES-26 (trademark) which is a strong acid cation exchange resin. Duolite ES-26 is made by Diamond-Shamrock Chemical Company and is a highly-crosslinked nuclear sulfonic macroporous polystyrene resin. In preparation for use in the treatment of vodka, the resin is conditioned to put it in the sodium form. The following examples illustrate the effect of ion-exchange treatment of vodka which has passed over activated charcoal.

EXAMPLE 1

25 grams of Duolite ES-26 (trademark) strong acid cation exchange resin made by Diamond-Shamrock Chemical Company was conditioned as described in its published Technical Sheet 105, with the resin ending in the sodium form. A final washing was made with 2 bed volumes of grain neutral spirits at 190 proof.

The respective analyses of the vodka before and after the ion exchange treatment were as follows:

| Before Treatment: | |
|---|---|
| conductivity | 36.0 micromho/cm |
| K content | 26.8 ppm |
| Na content | 0.7 ppm |
| After Treatment: | |
| conductivity | 20.3 micromho/cm |
| K content | 0.1 ppm |
| Na content | 16.4 ppm |

The treated and untreated vodka were compared by a panel composed of expert tasters. A very slight difference in taste was noted in the treated sample, but the quality was judged to be at least as good as that of vodka prepared by any prior process.

As is evident, the resin could have been used in the potassium form, but such a resin would be more costly.

EXAMPLE 2

In order to determine the effectiveness of ion-exchange resin in removing polyvalent ions, 25 grams of Duolite ES-26 (trademark) was conditioned as in Example 1 and to a sample of vodka salts of manganese and calcium were added.

The respective analyses of the vodka were as follows:

| Before Treatment: | |
|---|---|
| ppm Ca | 0.6 |
| ppm Mn | 0.7 |
| pH | 8.2 |
| After Treatment: | |
| ppm Ca | 0 |
| ppm Mn | 0 |
| pH | 8.4 |

Samples of adulterated vodka and adulterated-treated vodka were placed in storage at 120°F and 70°F. In 45 days, the adulterated vodka stored at 120°F developed a brown deposit on the wall of the bottle. Subsequent analysis of the deposit showed that it was principally manganese. The adulterated vodka which had been treated with ion-exchange resin showed neither haze nor deposit at the end of the storage period.

EXAMPLE 3

To determine the effect of ion-exchange treatment of a vodka having a low pH, a sample of vodka was adjusted in pH to 3.4 using HCl and was then adulterated with salts of calcium and manganese. The sample was passed over 25 grams of Duolite ES-26 (trademark) conditioned as in Example 1.

The respective analyses of the vodka were as follows:

| Before Treatment: | |
|---|---|
| ppm Ca | 0.5 |
| ppm Mn | 0.9 |
| pH | 3.4 |
| After Treatment: | |
| ppm Ca | 0 |
| ppm Mn | 0 |
| pH | 7.2 |

From these Examples it can be seen that vodka treated with ion-exchange resin suffers no deterioration in quality. Also, it is clear that treatment with an ion-exchange resin and in particular Duolite ES-26 (trademark) can remove calcium and manganese from vodka. In consideration of the known properties of ion-exchange resins of the sulfonated polystyrene type, it is evident that any polyvalent ions would be removed by such a resin when in the sodium or potassium form.

Example 3 was carried out to show that the relatively high pH of the vodka of Example 2 did not cause the precipitation of hydroxides of calcium or manganese which could be removed by mechanical filtration. Moreover, Examples 2 and 3 lead to the conclusion that the precipitates which form in vodka which has not been treated with ion-exchange resin are due to the formation of carbonates where the carbonate ion is the result of leaching of sodium carbonate from the glass of the bottle or from absorption of carbon dioxide from contact with air during processing.

It is interesting that the pH of the vodka of Example 3 where the pH had been lowered through the addition of hydrochloric acid, was raised to 7.2 by treatment with the ion exchange resin. Since other liquors such as tequila are high acidic and tend to strip copper from the copper stills presently used in the tequila industry, it appears likely that treatment with ion-exchange resin could be used to raise the pH subsequent to distillation and to remove copper from the product tequila. Similarly, ion-exchange resins could be used to remove iron which can cause darkening of whiskey.

The presence of copper in a liquor poses special problems where the liquor is to be made into cocktails and packaged in aluminum cans. Copper, if present in the product can be deposited on the inner surface of the aluminum cans and can cause localized electrolytic action leading to container perforation. As aforenoted, treatment with suitable ion-exchange resin could eliminate this difficulty.

It will thus be seen that the objects set forth above, among those made apparent from the preceding description, are efficiently attained, and since certain changes may be made in carrying out the above process and in the composition set forth without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A process for stabilization of vodka consisting essentially of the steps of treating vodka in the liquid phase with activated charcoal to remove or decrease the concentration of congenerics responsible for taste and odor in said vodka and treating the charcoal-treated vodka with a highly-crosslinked nuclear sulfonic macroporous polystyrene cationic exchange resin to remove polyvalent calcium and manganese ions introduced into said vodka by said treatment with activated charcoal and to control the pH of the vodka so that it lies within the range of about 7.2 to about 9.

2. The improvement as defined in claim 1, wherein said cationic exchange resin is combined with a monovalent metallic ion.

3. The improvement as defined in claim 2, wherein said monovalent metallic ion is sodium.

4. The improvement as defined in claim 1, wherein said vodka to be treated with said cationic exchange resin consists essentially of 45% water and 55% alcohol.

\* \* \* \* \*